(12) United States Patent
Granqvist et al.

(10) Patent No.: US 8,889,219 B2
(45) Date of Patent: Nov. 18, 2014

(54) THERMOCHROMIC MATERIAL AND FABRICATION METHOD

(75) Inventors: Claes Göran Granqvist, Uppsala (SE); Gunnar A. Niklasson, Uppsala (SE); Nuru R. Mlyuka, Uppsala (SE)

(73) Assignee: Chromogenics AB, Uppsala (SE)

( * ) Notice: Subject to any disclaimer, the term of this patent is extended or adjusted under 35 U.S.C. 154(b) by 185 days.

(21) Appl. No.: 13/121,277

(22) PCT Filed: Sep. 30, 2009

(86) PCT No.: PCT/IB2009/054281
§ 371 (c)(1),
(2), (4) Date: Jul. 11, 2011

(87) PCT Pub. No.: WO2010/038202
PCT Pub. Date: Apr. 8, 2010

(65) Prior Publication Data
US 2011/0260123 A1    Oct. 27, 2011

(30) Foreign Application Priority Data

Sep. 30, 2008  (WO) ................ PCT/SE2008/051101

(51) Int. Cl.
*B05D 5/12*    (2006.01)
*H01M 4/13*    (2010.01)
*G08B 21/00*   (2006.01)
*C09K 9/00*    (2006.01)

(52) U.S. Cl.
CPC ...................................... *C09K 9/00* (2013.01)
USPC ................. 427/126.4; 429/231.5; 340/636.14

(58) Field of Classification Search
USPC ......... 252/583; 427/160, 419.2–419.7, 126.4; 428/701, 472, 699; 204/192.22–192.23; 429/231.5; 340/636.14
See application file for complete search history.

(56) References Cited

U.S. PATENT DOCUMENTS

| | | | |
|---|---|---|---|
| 4,401,690 A | 8/1983 | Greenberg | |
| 6,440,592 B1 * | 8/2002 | Meyer et al. | 428/701 |
| 7,704,754 B2 * | 4/2010 | Malak | 436/524 |
| 2007/0048438 A1 * | 3/2007 | Parkin et al. | 427/96.8 |

FOREIGN PATENT DOCUMENTS

| | | | |
|---|---|---|---|
| EP | 1491515 A1 | | 12/2004 |
| EP | WO2008087077 | * | 7/2008 |
| WO | WO0044032 | * | 7/2000 |
| WO | 01/14498 A1 | | 3/2001 |
| WO | WO01/14498 | * | 3/2001 |
| WO | 2008/087077 A1 | | 7/2008 |

OTHER PUBLICATIONS

Lu et al, Thin Solid films, 353:40-44 (1999).
Livage, Coordination Chemistry Reviews, 190-192:391-403 (1999).

* cited by examiner

*Primary Examiner* — Monique Peets
(74) *Attorney, Agent, or Firm* — Porter Wright Morris & Arthur LLP

(57) ABSTRACT

In a method for manufacturing of thermochromic material, a target increased luminous transmittance level for the thermochromic material is determined (210). The luminous transmittance level is defined within a predetermined wavelength region. Preferably, this predetermined wavelength region at least partly comprises visible light. A concentration level of a first dopant element is determined (212) for generating the luminous transmittance level of the thermochromic material. The first dopant element is capable of forming an oxide having a high bandgap in its electronic structure, and in a specific embodiment is Al and/or Mg. A $VO_2$-based thermochromic material is doped (214) with the determined concentration level of the first dopant element. At least one second dopant may also be employed.

18 Claims, 7 Drawing Sheets ically, the transition temperature upon heating is slightly higher than the transition temperature upon cooling due to hysteresis effects. Such hysteresis effects are probably at least to a part dependent on crystallinity imperfections in the films. However, for practical use, an average transition temperature is typically the most important to consider. Most of the best thermochromic surface coatings developed so far are based on vanadium dioxide ($VO_2$). The material is structurally changed at a critical temperature, i.e. the transition temperature, which for pure $VO_2$ is situated at about 68° C. The transmittance is increased when the temperature goes below the transition temperature. The use of pure $VO_2$ thermochromic materials is in prior art limited by e.g. too high transition temperature and too low transparency in the visible region.

THERMOCHROMIC MATERIAL AND FABRICATION METHOD

RELATED APPLICATIONS

The present application is a 371 of PCT/IB2009/054281 filed Sep. 30, 2009, which claims priority under 35 U.S.C. 120 of PCT/SE2008/051101 filed Sep. 30, 2008.

TECHNICAL FIELD

The present invention relates to thermochromic materials and fabrication thereof.

BACKGROUND

Chromogenic materials are characterized in that their optical properties may be changed in response of an external stimulus. The main chromogenic technologies are electrochromic (depending on electrical voltage or charge), thermochromic (depending on temperature), photochromic (depending on ultraviolet irradiation), and gasochromic (depending on exposure to reducing or oxidizing gases). The present invention relates to thermochromic materials. Chromogenic materials have been used e.g. in various optical applications, such as windows, mirrors, spectacles, visors etc. Different techniques have been selected, depending on the specific requirements in the different applications.

Thermochromic materials exhibit a reduction in transparency when the temperature increases. This reduction takes place mainly in the infrared region. Typically, there is a certain temperature around which the transparency in the infrared wavelength range is changed from a "light state" (high transparency) to a "dark state" (low transparency). For wavelengths in the visible region, the transparency is typically influenced very little. Similarly, the thermochromic materials switch from a dark state to a light state when the temperature goes under a certain critical temperature. This temperature is referred to as the transition temperature (upon cooling). Typi- In prior art, there are many attempts to reduce the transition temperature by doping with different elements; a typical example is doping with W, c.f. e.g. the sections regarding thermochromic materials in "Transparent conductors as solar energy materials: A panoramic review", by C. G. Granqvist, in Solar Energy Materials &. Solar Cells 91 (2007), sect. 5.2-5.3, pp. 1555-1558. Furthermore, in "Optical and electrical properties of vanadium oxides synthesized from alkoxides", by J. Livage, Coordination Chemistry Reviews 190-192 (1999), pp. 391-403, a number of dopants—$W^{6+}$, $Nb^{5+}$, $Ti^4$ and $Al^{3+}$—have been tested as to their influence on the transition temperature. Tungsten could be used to lower the transition temperature, while doping with aluminium instead increases the transition temperature. Also, in the published international patent application WO01/14498, different transition metals of a valence in their oxides of at least 5 are used as dopants for lowering the transition temperature. Dopants selected from transition metals with a valence equal or below 4 may be selected if a higher transition temperature is required.

However, a remaining problem for being attractive in e.g. window applications is the low transparency of the thermochromic material for wavelengths in the visible range. A low transparency for these wavelengths gives an impression of a dark window and reduces the ability to watch details through the window.

SUMMARY

An object of the present invention is to provide improved thermochromic materials with increased and or relatively high luminous transmittance. A further object of the present invention is to provide such thermochromic materials also having a transition temperature in the vicinity of room temperature.

The present invention is directed to methods, materials and uses of thermochromic materials. In general words, according to a first aspect, a method for manufacturing a $VO_2$-based thermochromic material comprises determining a target increased luminous transmittance level for the thermochromic material in a predetermined wavelength region, determining a concentration level of a first dopant element, wherein the first dopant element is capable of forming an oxide with a high bandgap in its electronic structure, for generating the increased luminous transmittance level of the thermochromic material, and doping the $VO_2$-based thermochromic material with the concentration level of the first dopant element. In a specific embodiment wherein the first dopant element is Al, the concentration is at least 1.1 at % Al, more specifically or most preferably at least 1.8 at % Al.

According to a second aspect, Al is used as a dopant for increasing luminous transmittance of a $VO_2$-based thermochromic material. In a specific embodiment, Al is used in a concentration of at least 1.1 at % Al, more specifically or most preferably at least 1.8 at % Al, in the $VO_2$-based thermochromic material.

According to a third aspect, a thermochromic material comprises $VO_2$ doped with at least one element selected from the group consisting of W, Mo, Nb and Ta, more specifically W, and at least 0.2 at % Al, preferably at least 0.6 at % Al, more preferably at least 1.1 at % Al, most preferably at least 1.8 at % Al.

According to a fourth aspect, a thermochromic material comprises $VO_2$ doped with at least 0.35 at % Mg, preferably at least 0.8 at % Mg, more preferably at least 1.3 at % Mg, even more preferably at least 1.7 at % Mg, still even more preferably at least 2.2 at % Mg, most preferably at least 2.9 at % Mg, preferably less than 5.5 at % Mg, and most preferably less than 4.9 at % Mg.

According to a fifth aspect, an element capable of forming an oxide with a high bandgap in its electronic structure is used as a dopant for increasing the luminous transmittance of a $VO_2$-based thermochromic material. In a specific embodiment wherein the element is Al, the concentration is at least 1.1 at % Al, more specifically or most preferably at least 1.8 at % Al.

According to a sixth aspect, a thermochromic material comprises $VO_2$ doped with Mg.

One advantage of the methods, materials and/or uses of the present invention is that thermochromic materials can be provided which have luminous transmittance properties which suit various applications of the materials. In a specific embodiment, the thermochromic materials according to the invention are attractive, for example, for window applications.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

For many years, doping $VO_2$ with different transition metals has been performed for modifying a transition temperature of the thermochromic material. The valency of the dopant ions is believed to control this mechanism. In particular, high-valency ions like $W^{+6}$ have been proven to be efficient in lowering the transition temperature.

It has now surprisingly been realized that other types of dopants may influence the $VO_2$ in other respects. Transition metals capable of forming oxides having a high-bandgap have been found to influence the luminous transmittance of $VO_2$ in the visible wavelength range. High bandgap is in the present disclosure defined as being larger than what is necessary to provide clarity for the eye, typically higher than 4 eV. Experiments described herein employ Al and Mg as dopants. However, other elements capable of forming oxides having high bandgaps are also suitable for use as dopants for influencing the luminous transmittance of $VO_2$. Non-exclusive examples are Ce, Hf, Ta, Zr and Si. In one embodiment, the $VO_2$ material includes Al and/or Mg as dopant(s). In other embodiments, the $VO_2$ material includes a dopant other than Al, the $VO_2$ material includes a dopant other than Mg, or the $VO_2$ material includes Ce, Hf, Ta, and/or Si as a dopant, optionally together with Al or Mg.

Figure 1:
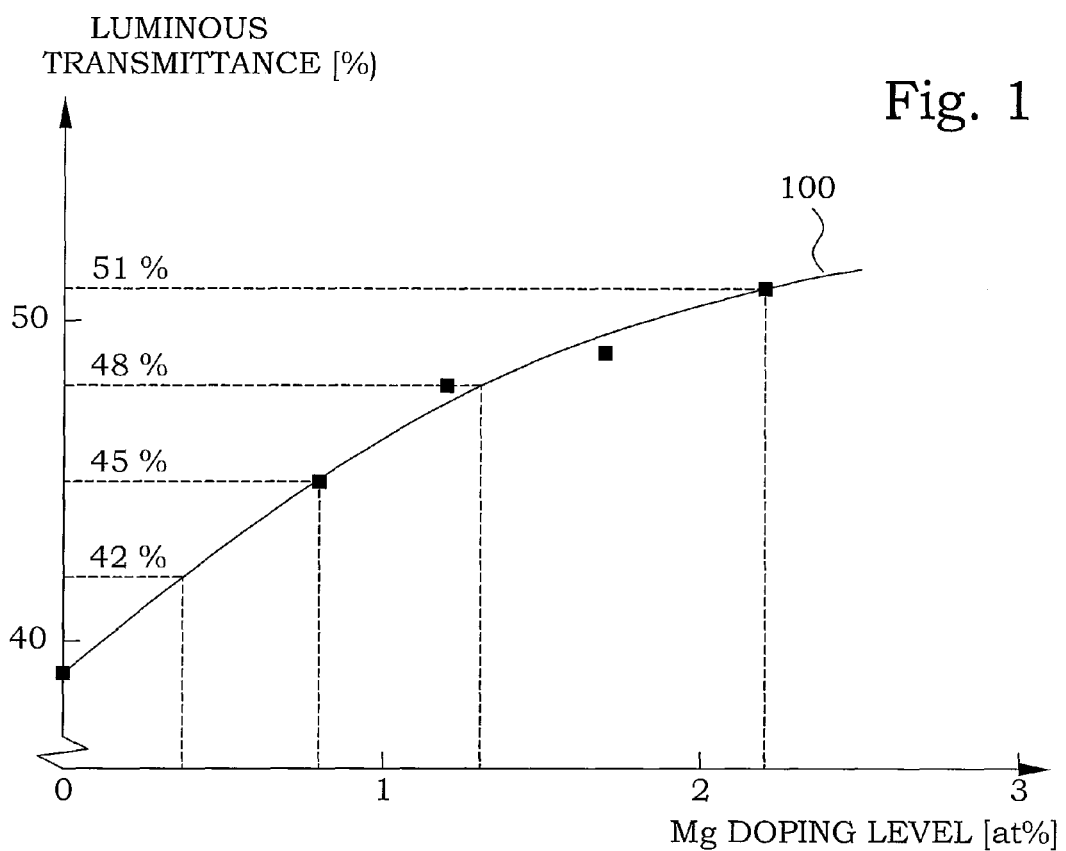
FIG. 1 is a diagram illustrating luminous transmittance of a $VO_2$ based thermochromic film as a function of Mg doping level.

FIG. 1 illustrates luminous transmittance in the visible wavelength range as a function of the Mg dopant level. The luminous transmittance level is defined within a predetermined wavelength region. Preferably, this predetermined wavelength region at least partly comprises visible light. In another embodiment, the predetermined wavelength region primarily comprises visible light. Throughout this disclosure, the dopant levels are expressed as atomic percent of the dopant compared to the total amount of atoms, i.e. the ratio between the number of dopant atoms and the sum of dopant atoms, V atoms and O atoms. In other words, the dopant level is given as x in $D_xV_yO_z$, where $x+y+z=1$ and D denotes the dopant or dopants in the case of two or more dopants being employed in combination. The oxide MgO presents a high bandgap in its electronic structure. While not intending to be limited by theory, a high bandgap in its electronic structure is believed to influence the transparency characteristics in the visible wavelength range. The luminous transmittance is defined as:

$$T_{lum} = \int \Phi_{lum}(\lambda)T(\lambda)d(\lambda)/\int \Phi_{lum}(\lambda)d(\lambda),$$

where $T(\lambda)$ denotes spectral transmittance, $\Phi_{lum}(\lambda)$ is the standard luminous efficiency function for photopic vision in the wavelength range of 380-760 nm, and $\Phi_{lum}(\lambda)=0$ outside this range. The luminous transmittance is increasing with increasing dopant content and an empirical curve 100 can be estimated, according to which the luminous transmittance is expected to vary. Thus, in a specific embodiment, the luminous transmittance is increase in the visible light range.

A luminous transmittance level of 42% could be acceptable for certain applications and/or at certain light conditions. In particular in combination with different kinds of multilayer antireflection structures, such levels can be useful for achieving an end product that is not experienced as very dark by a user. A luminous transmittance of 42% is estimated to be achieved by using a dopant level of Mg of 0.35 at %. However, more preferably, the luminous transmittance is above 45%, where either the total impression gives a lighter experience or less complex additional coatings can be used. This corresponds to a Mg dopant level of 0.8 at %. More preferably, the luminous transmittance is larger than 48%, which corresponds to a Mg dopant level of 1.3 at %. Most preferably, the luminous transmittance is larger than 51%, which corresponds to a Mg dopant level of 2.2 at %.

Figure 2:
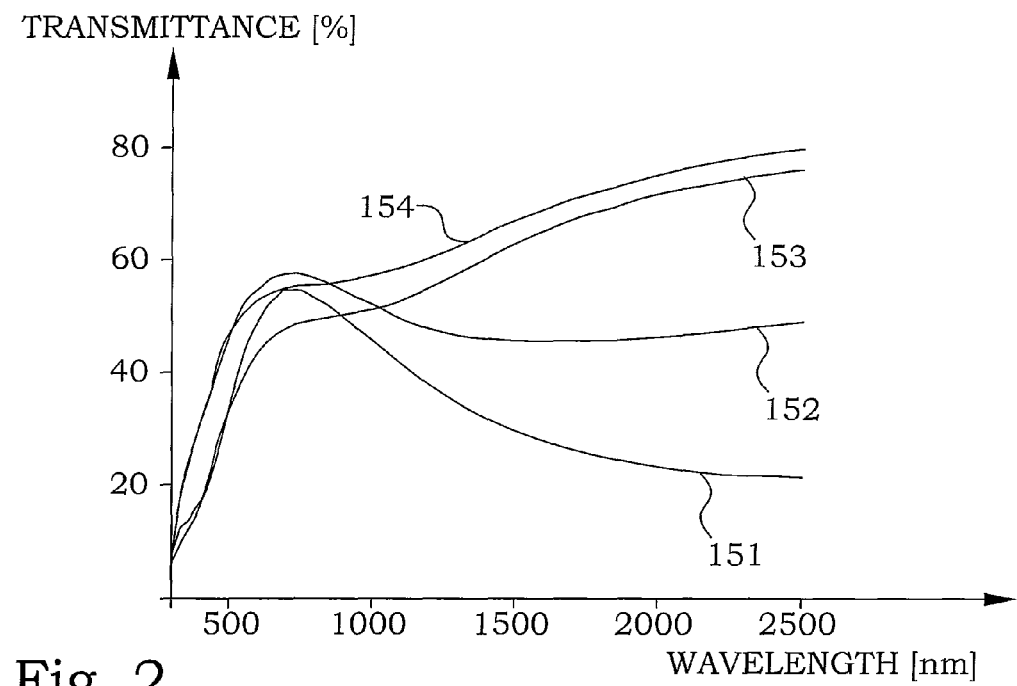
FIG. 2 is a diagram illustrating transmittance as a function of wavelength for $VO_2$ based thermochromic films.

FIG. 2 illustrates four transmittance curves as functions of wavelength, for temperatures above and below the transition temperature, respectively, for a pure $VO_2$ film and for a $VO_2$ film doped with 2.2 at % Mg. Curve 151 corresponds to a pure $VO_2$ film above the transition temperature, curve 152 corresponds to a $VO_2$ film doped with 2.2 at % Mg above the transition temperature, curve 153 corresponds to a pure $VO_2$ film below the transition temperature, and curve 154 corresponds to a $VO_2$ film doped with 2.2 at % Mg below the transition temperature. The film thickness was about 50 nm in all cases. Here it can be noticed that the transparency in the infrared region changes considerably, whereas the transparency at visible wavelengths is essentially the same. This is an illustration of the thermochromic effect.

However, it can be noticed that the achieved transparency levels at visible wavelengths are higher for $VO_2$ doped with Mg than for pure $VO_2$ or for $VO_2$ doped with high-valency transition metals. One may also notice that the magnitude of the thermochromic effect itself also varies somewhat with the doping level of Mg. The difference between the dark and light states becomes smaller with increasing amount of dopants. This means that it is not meaningful to dope the $VO_2$ with too large amounts of Mg, since eventually, no thermochromism will be present any more. In one embodiment, the upper limit of dopant level of Mg is 6 at %.

Figure 3:
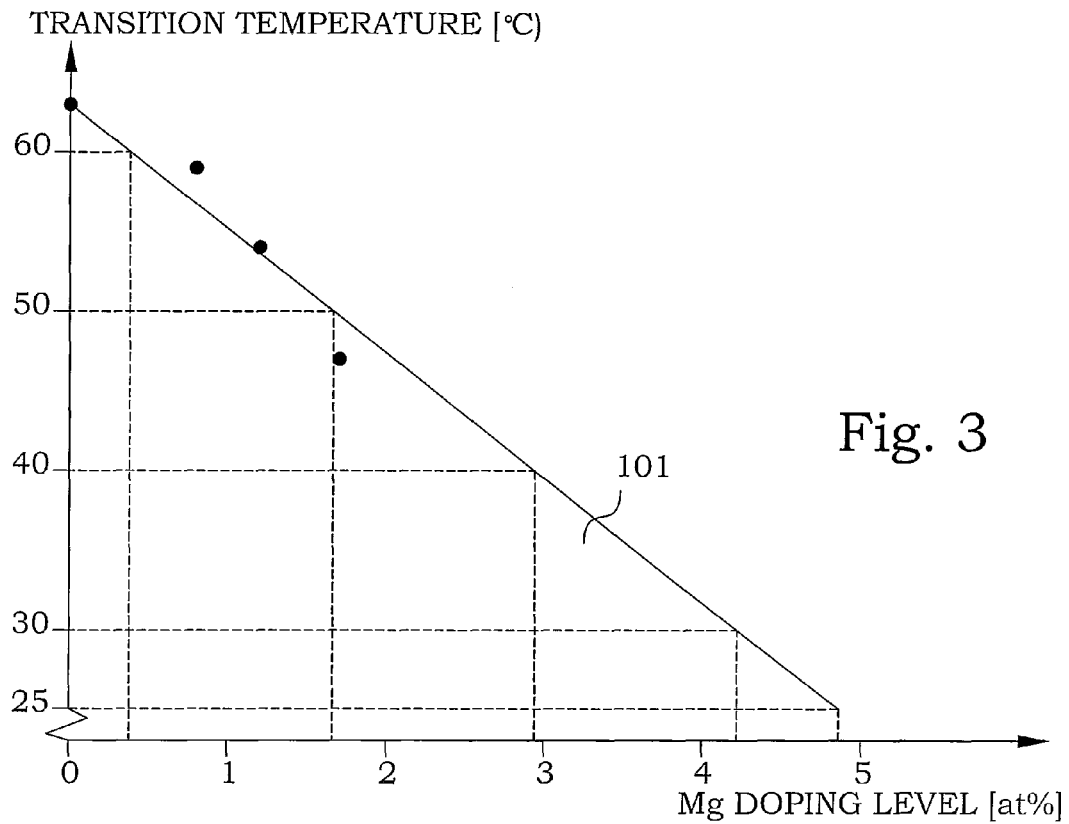
FIG. 3 is a diagram illustrating transition temperature of a $VO_2$ based thermochromic film as a function of Mg doping level.

During the investigations with Mg dopants, the transition temperature was also monitored. FIG. 3 illustrates the transition temperature as a function of dopant level. It is here noticed that doping with Mg also will give a reduction in transition temperature. This is very surprising indeed, since earlier experiments point to that doping with low-valency transition metals typically increase the transition temperature. Typically, a transition temperature below 50° C. is of advantage, since most applications require operation in the vicinity of room temperature, and a typical heating of the thermochromic film itself is typically relatively small. More preferably, the transition temperature is below 40° C. It is also typically an advantage that the transition temperature is not too low, e.g. not below 20° C., since there is in most applications some kind of heating of the film. More preferably, the transition temperature should not be below 25° C. By earlier experiments with other dopants, it has been found that the lowering of the transition temperature is approximately linear with the concentration, at least for low concentrations. A transition temperature line 101 is thereby estimated from the experimental results. From this line, it is estimated that a transition temperature of 50° C. can be reached by doping with 1.7 at % Mg, a transition temperature of 40° C. can be reached by doping with 2.9 at % Mg, a transition temperature of 25° C. can be reached by doping with 4.9 at % Mg and a transition temperature of 20° C. can be reached by doping with 5.5 at % Mg. A thermochromic film of $VO_2$, doped with 2.9-4.9 at % Mg will therefore present a transition temperature as well as a luminous transmittance that is suitable for a large majority of thermochromic film applications. However, also ranges 1.7-4.9 at % Mg, 2.7-5.5 at % Mg and 1.7-5.5 at % Mg are particularly suitable for doping $VO_2$ with only Mg.

Figure 4:
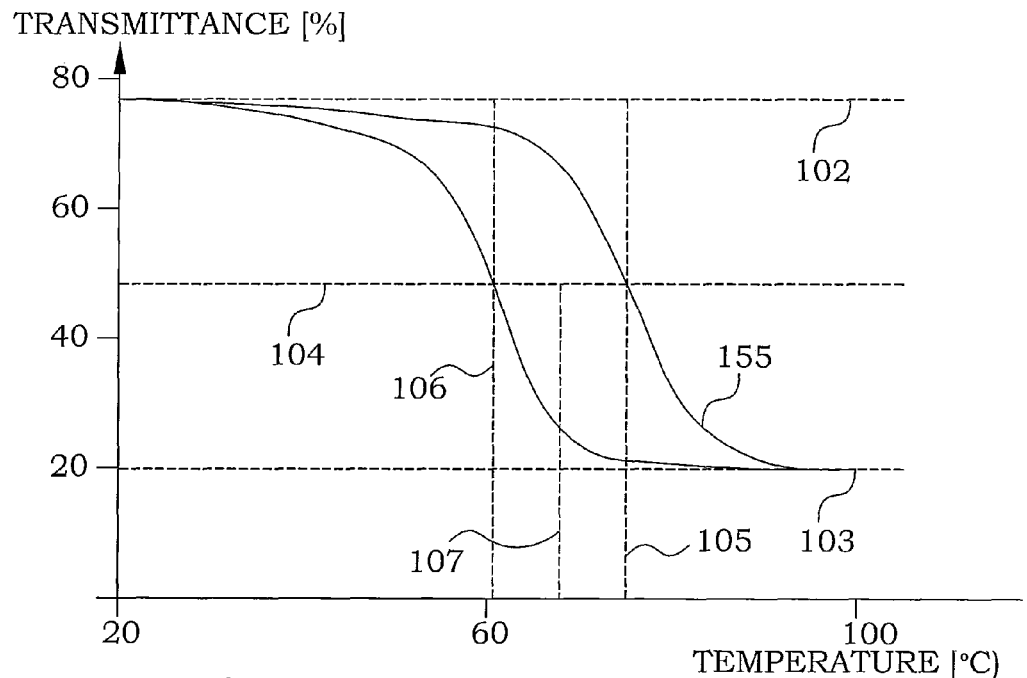
FIG. 4 is a diagram illustrating the hysteresis behaviour of a thermochromic material.

FIG. 4 illustrates an example of a typical hysteresis curve 155 of the thermochromism. The transmittance changes from a high value 102 to a low value 103 and back. A mean transmittance level 104 can be defined as the arithmetic average of the high value 102 and the low value 103. This mean transmittance level 104 is passed upon heating at a first temperature 105, and upon cooling at a second temperature 106. An average transition temperature 107 can then be defined as an arithmetic average of the first and second temperatures 105, 106. This definition of transition temperature is used throughout the present disclosure. Such a definition of transition temperature is to a first approximation independent of the crystalline properties of the film in question.

Figure 5:
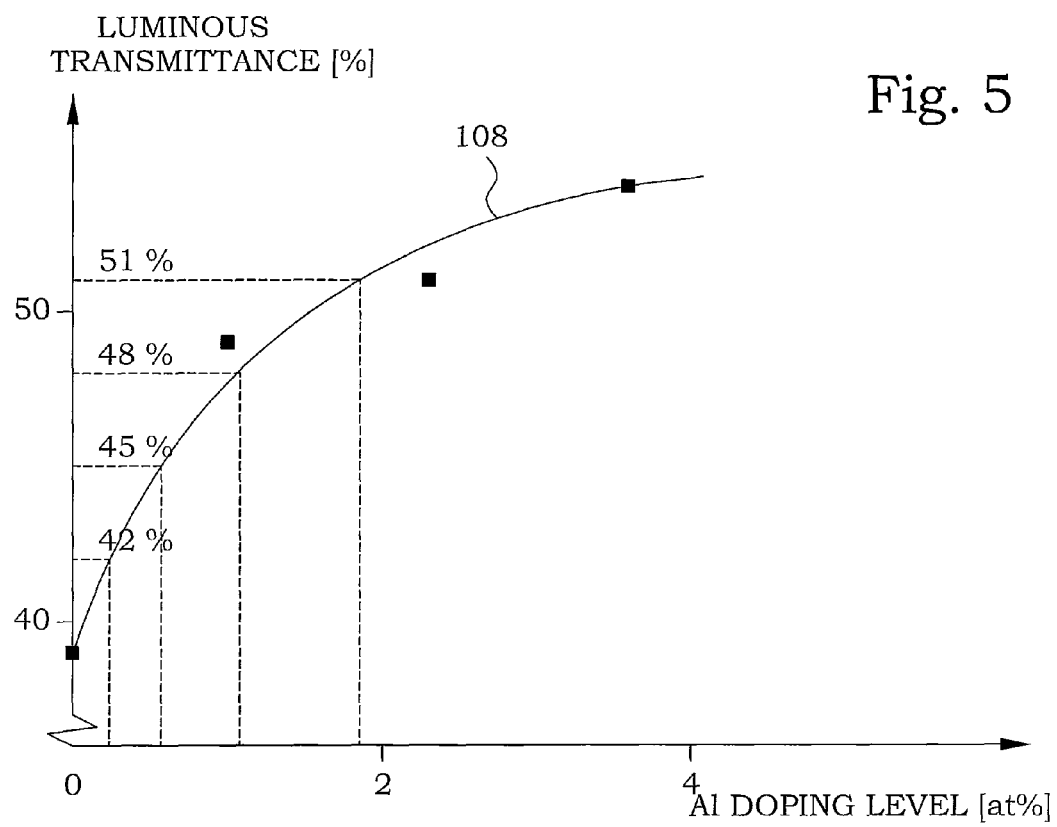
FIG. 5 is a diagram illustrating luminous transmittance of a $VO_2$ based thermochromic film as a function of Al doping level.

Also experiments with Al doping are described. FIG. 5 illustrates luminous transmittance for visible wavelengths as function of Al dopant level. The oxide $Al_2O_3$ also presents a high bandgap in its electronic structure. Also here an empirical curve 108 can be estimated. From this, a luminous transmittance of 42% is estimated to be achieved by using a dopant level of Al of 0.2 at %. However, more preferably, the luminous transmittance is above 45%, where either the total experience gives a lighter impression or less complex additional coatings can be used. This corresponds to an Al dopant level of 0.6 at %. Even more preferably, the luminous transmittance is larger than 48%, which corresponds to an Al dopant level of 1.1 at %. Most preferably, the luminous transmittance is larger than 51%, which corresponds to an Al dopant level of 1.8 at %.

Figure 6:
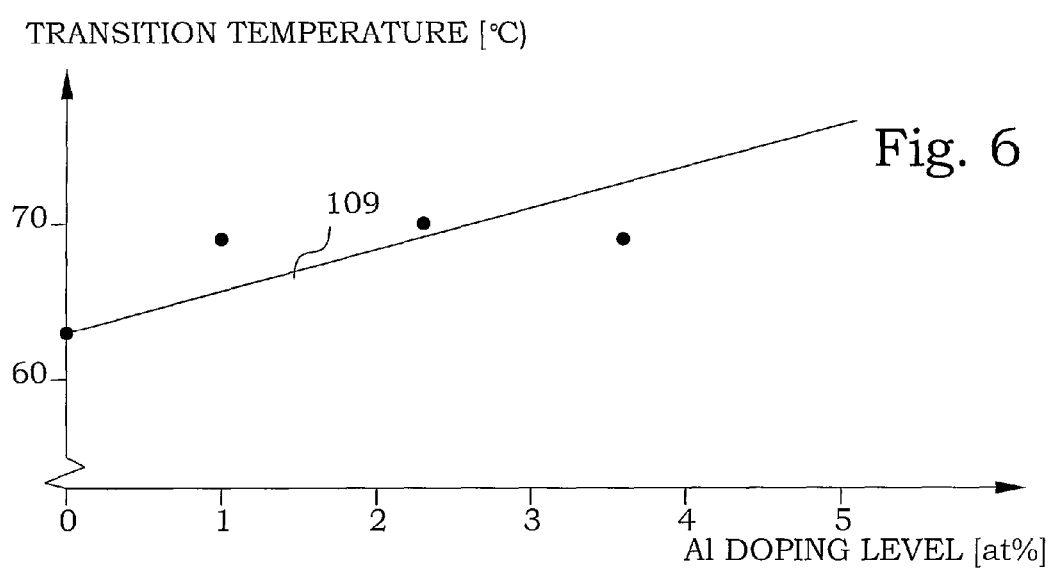
FIG. 6 is a diagram illustrating transition temperature of a $VO_2$ based thermochromic film as a function of Al doping level.

During the investigations with Al dopants, also the transition temperature was monitored. FIG. 6 illustrates the transition temperature as a function of dopant level. It is here noticed that doping with Al also will give an increase in transition temperature, as indicated by earlier investigations. This is characterised by the line 109.

However, during the experiments with Al, it could be seen that the deterioration of the thermochromism as found for the Mg doping was considerably lower in the case of Al. The doping with Al thus destroys the thermochromism to a smaller degree than the doping with Mg does in the $VO_2$ material.

Figure 7:
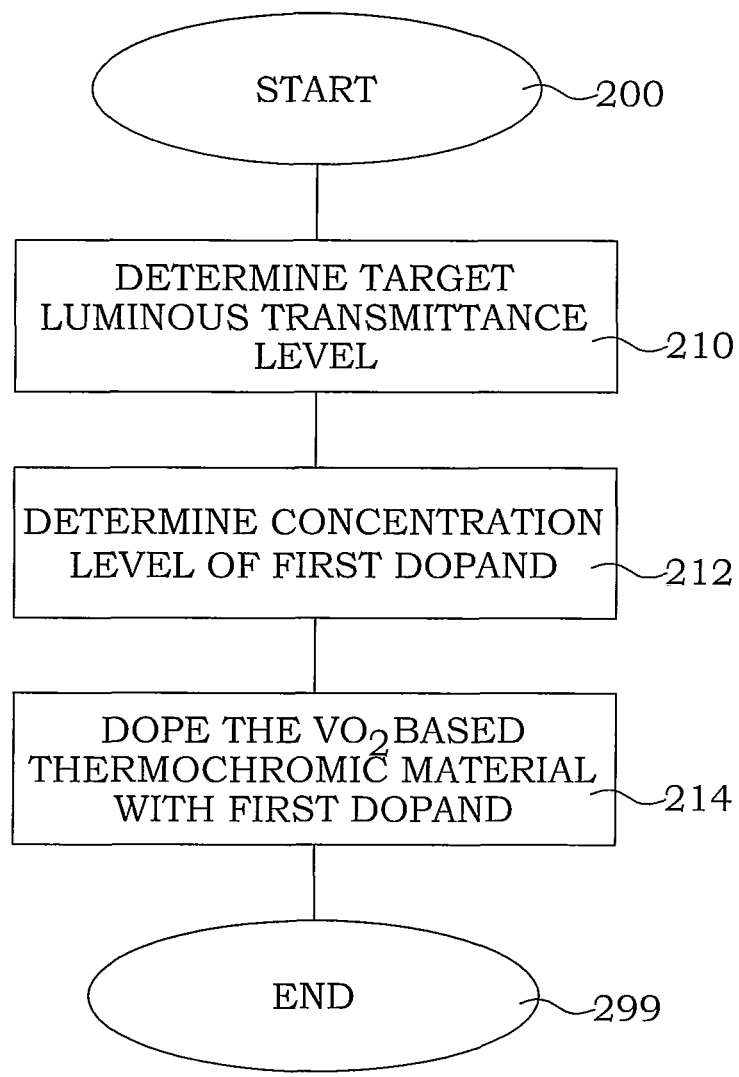
FIG. 7 is a flow diagram of steps of an embodiment of a method according to the present invention.

A flow diagram of steps of an embodiment of a method according to the present invention is illustrated in FIG. 7. The method for manufacturing of thermochromic material begins in step 200. In step 210, a target increased luminous transmittance level for the thermochromic material, based on $VO_2$, is determined. The luminous transmittance level is defined as above. In step 212, a concentration level of a first dopant element is determined for generating the luminous transmittance level of the thermochromic material. The first dopant element is capable of forming an oxide presenting a high bandgap in its electronic structure, and is preferably Al and/or Mg, although other elements as discussed above may also be used. When Mg and/or Al is used as a dopant, the concentration levels are preferably determined by the diagrams in FIGS. 1 and 5. A $VO_2$-based thermochromic material is doped with the determined concentration level of the first dopant element in step 214. The process ends in step 299.

If a certain luminous transmittance is selected, a corresponding doping concentration of Mg and/or Al can be found. However, the achieved transition temperature may not be the optimum. This can be compensated for by utilizing co-doping.

If a target transition temperature lies between the transition temperatures achieved by doping with pure Al or by pure Mg, co-doping with both Al and Mg can be used. Since doping with Al influences the magnitude of the thermochromic behaviour less than Mg, a trade-off between transition temperature and thermochromic effect may be of interest in certain applications. In low concentrations, the effects caused by Mg and Al are believed to be substantially independent of any existence of the other element. An approximate linear relation is thus assumed to be valid.

Figure 8:
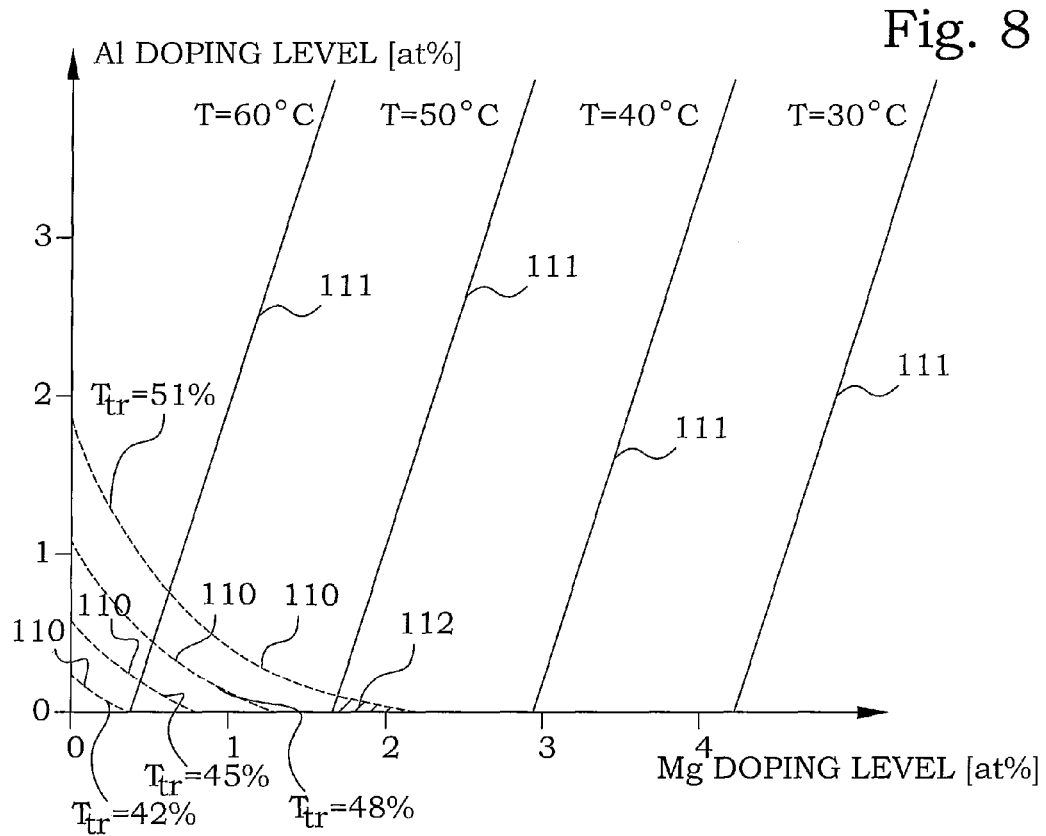
FIG. 8 is a diagram illustrating the effect on transition temperature and luminous transmittance by co-doping a $VO_2$ based thermochromic film with Al and Mg.

FIG. 8 illustrates co-doping of Al and Mg. In the diagram, full lines 111 indicate estimated iso-transition-temperatures, i.e., compositions giving the same transition temperature, and broken lines 110 indicate estimated iso-luminous transmittance, i.e., compositions giving the same luminous transmittance. In the area denoted by 112, thermochromic materials are expected to have a luminous transmittance level of below 51% and at the same time a transition temperature below 50° C. In the same fashion, different useful co-doping materials can be defined by such a diagram. As an example, if a luminous transmittance level of 51% is requested, this can be achieved by doping with pure Mg to a level of 2.2 at %. However, if a transition temperature of 50° C. is acceptable, a co-doping of 1.7 at % Mg and 0.1 at % Al might be an alternative, since a larger thermochromic effect may be achieved.

Co-doping can also be performed with one or more elements other than Al and Mg. The second dopant element is then preferably selected from high-valency transition metals, preferably a transition metal having a valency of at least +5, such as W, Mo, Nb, or Ta, or a dopant element capable of forming an oxide with a high bandgap in its electronic structure, which is different from the first dopant element. In one embodiment, Al is employed in combination with at least one other dopant. In another embodiment, Mg is employed in combination with at least one additional dopant. In specific embodiments, the $VO_2$ material is doped with Mg and W; Al and W; Mg, Al and W; or one of Ce, Hf, Ta, Zr or Si and W. In additional embodiments, the $VO_2$ material is doped with Mg and Mo; Mg and Nb; Mg and Ta; Al and Mo; Al and Nb; or Al and Ta.

Figure 9:
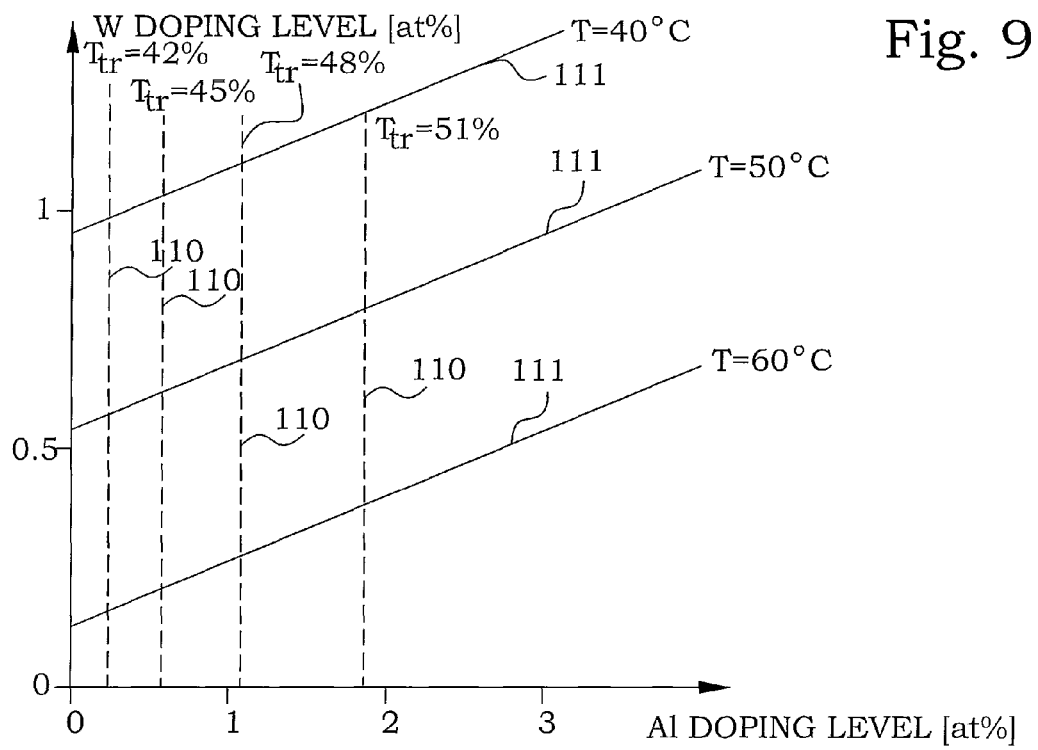
FIG. 9 is a diagram illustrating the effect on transition temperature and luminous transmittance by co-doping a $VO_2$ based thermochromic film with Al and W.

FIG. 9 is a diagram illustrating expected results from co-doping of Al and W. The concentrations of the dopants are given at the axes. In the diagram, full lines indicate estimated iso-transition-temperatures and broken lines indicate estimated iso-luminous transmittance, as in FIG. 8. In the present FIG. 9, the iso-luminous transmittance lines are vertical, since they are not influenced significantly by W doping. In this way, it is possible to tailor a thermochromic material to achieve a predetermined luminous transmittance level and a predetermined transition temperature, within certain extreme limits. It is seen that also the transition temperature lines are to a first approximation linear. As an example, for the combination of 0.6 at % Al and 1.0 at % W, a thermochromic material will result, having a transition temperature at least below 40° C. and a luminous transmittance of at least above 45%. For applications needing a transition temperature below 50° C. and a luminous transmittance of about 42%, a co-doping of Al and W would need at least 0.57 at % W, for a luminous transmittance of 45%, at least 0.62 at % W, for a luminous transmittance of 48%, at least 0.69 at % W and for a luminous transmittance of 51%, at least 0.79 at % W, in order to compensate the increase in transition temperature caused by the Al dopant. Similarly, for applications needing a transition temperature below 40° C. and a luminous transmittance of 42%, a co-doping of Al and W would need at least 0.99 at % W, for a luminous transmittance of 45%, at least 1.0 at % W, for a luminous transmittance of 48%, at least 1,1 at % W and for a luminous transmittance of 51%, at least 1.2 at % W. In other words, for compensating each percent in Al doping, 0.13 at % W has to be added to keep the same transition temperature.

Figure 10:
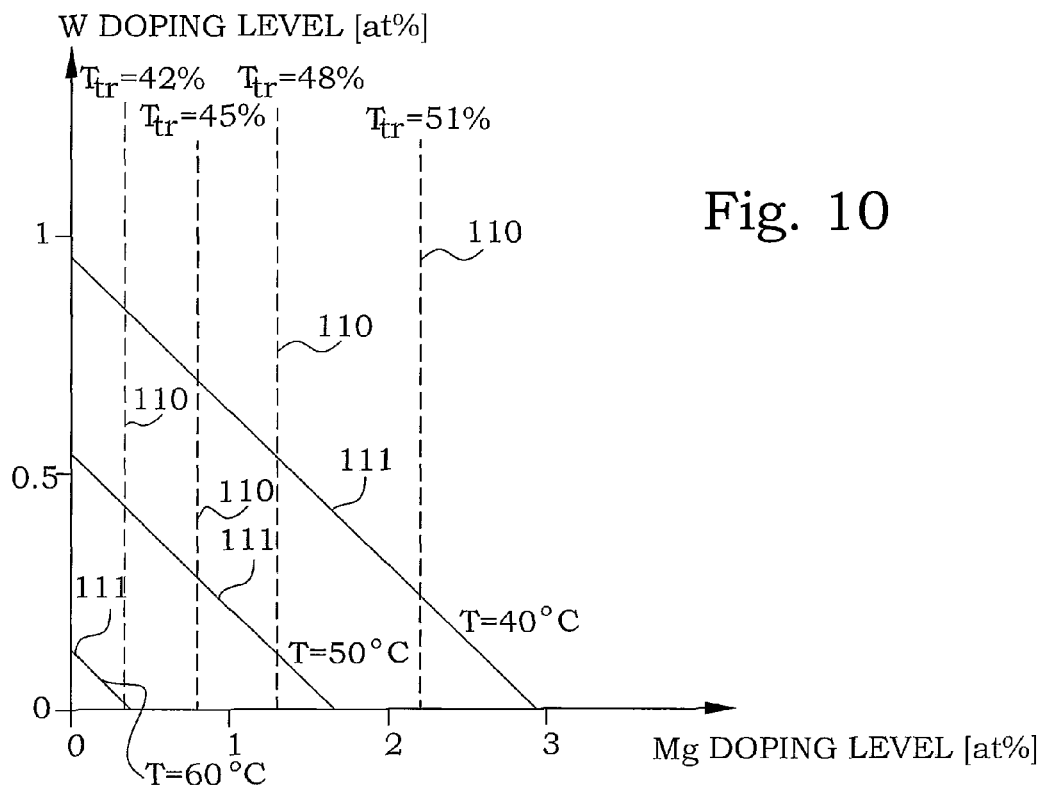
FIG. 10 is a diagram illustrating the effect on transition temperature and luminous transmittance by co-doping a $VO_2$ based thermochromic film with W and Mg.

Corresponding diagrams can be provided also for other combinations of co-dopants. For the combination of Mg and W, a diagram would look like FIG. 10. Here, it can be seen that the amount of Mg doping can be exchanged for an amount of W doping. In order to reach the same transition temperature, each atomic percent of Mg has to be exchanged for about 0.3 at % of W.

Figure 11:
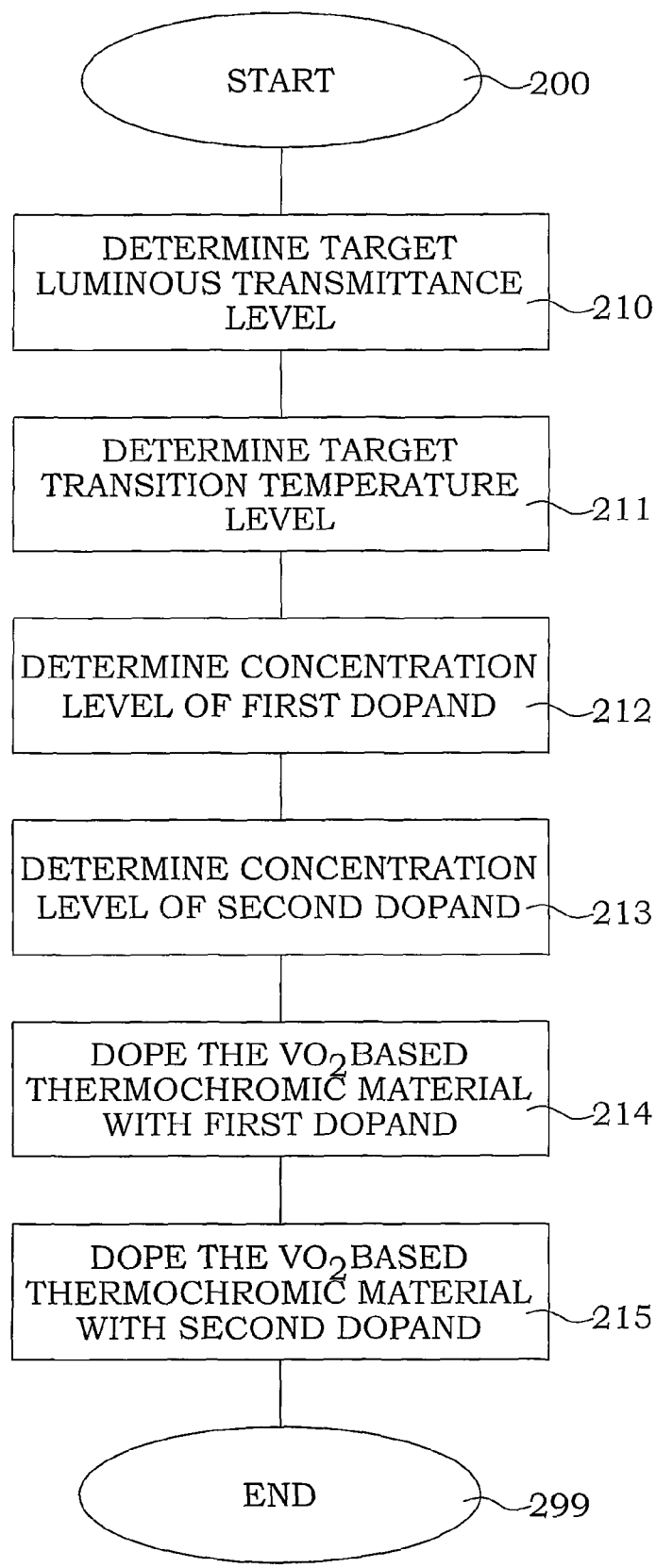
FIG. 11 is a flow diagram of steps of another embodiment of a method according to the present invention.

A flow diagram of steps of another embodiment of a method according to the present invention is illustrated in FIG. 11. Steps that are similar to the ones shown in FIG. 7 are not described again. In a step 211, a target transition temperature level for the thermochromic material is determined. The transition temperature is defined in a predetermined way. Preferably, this predetermined transition temperature is lower than 50° C., and even more preferred even closer to room temperature. In step 213, a concentration level of a second dopant element is determined for generating the transition temperature of the thermochromic material together with the determined concentration level of the first dopant. The second dopant element is preferably selected among high-valency transition metals, preferably a transition metal having a valency of at least +5 in its oxide, such as W, Mo, Nb, or Ta. A $VO_2$-based thermochromic material is doped with the determined concentration level of the second dopant element in step 215. Although illustrated as separate steps, the steps 214 and 215 are preferably performed jointly. Also the steps 212 and 213 may be performed jointly, since the dopant levels may influence both properties.

Figure 12:
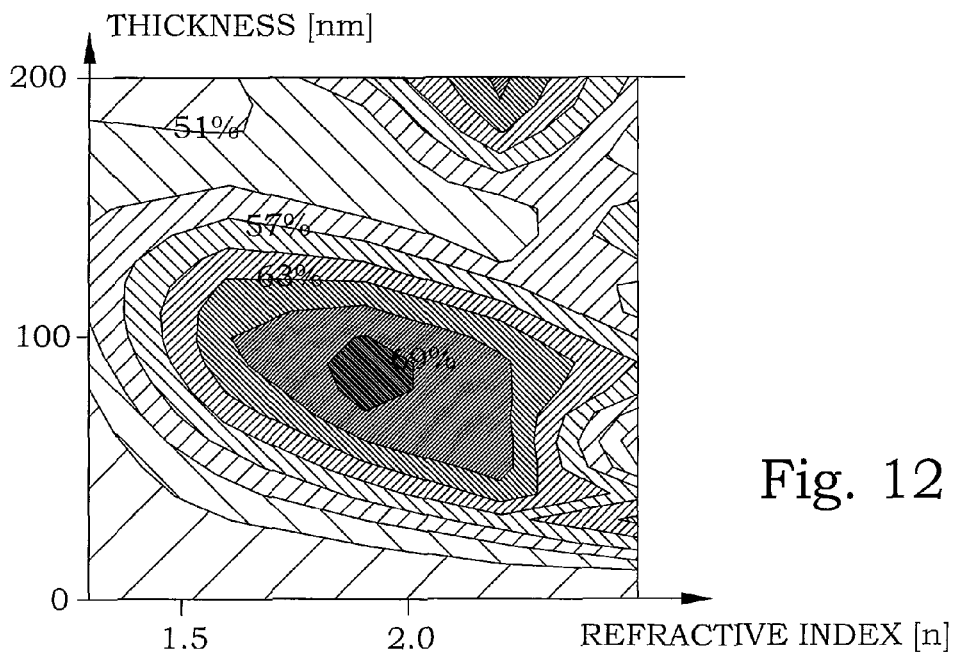
FIG. 12 is a diagram illustrating simulation results of luminous transmittance from a multilayer coating comprising a Mg doped $VO_2$ based thermochromic film.

At a first glance, an increase of a luminous transmittance level of a few percent might not seem too significant. However, such an increase in luminous transmittance can readily be combined with other luminous transmittance-increasing approaches, where the final changes are much larger. FIG. 12 shows a plot of the result of a transmittance simulation of a multilayer film based on doped $VO_2$ and $MO_q$, where M is a fictive transition metal with differing refractive index. The simulation assumes a 50 nm thick $VO_2$ film doped with 1.7 at % Mg arranged between two layers of $MO_q$, all based on a transparent substrate with a refractive index of 1.5. The thickness of the $MO_q$ layers as well as the refractive index was varied in the simulation and the resulting transmittances are illustrated in FIG. 12. At a $MO_q$ layer thickness of around 80 nm and a refractive index of 1.9, a total transmittance of almost 0.70 was achieved. It is worth noting that $TiO_2$ can have a refractive index of about 2.2 and is thus almost perfectly suited to be used as $MO_q$ in such multilayer arrangements.

The present invention employs transition metals capable of forming oxides having a high bandgap in their electronic structure, such as e.g. Al and Mg, for increasing luminous transmittance of a $VO_2$-based thermochromic material in the visible wavelength region.

The $VO_2$-based thermochromic materials according to the present invention may be in any desired physical form or shape, for example as a film or coating. In another embodiment, the thermochromic material can be in a particulate form, for example, as a pigment or flakes, with a linear size on the order of, or larger than, the wavelength of visible light. This particulate form, for example, a pigment or flake, will have properties similar to those of the thermochromic films shown in the figures. The particulate forms allow manufacturing of foils, films and the like comprising a transparent binder.

Alternatively, the $VO_2$-based thermochromic materials may be in the form of nanoparticles. For example, $VO_2$-based thermochromic pigment can be nanosized. $VO_2$-based thermochromic nanoparticles are known to exhibit localized plasmon resonances for light in the near infrared, and this resonance leads to optical absorbance that can be turned on an off when the temperature is varied. The principles for such thermochromic modulation of nanoparticles are described by Bai et al, *Nanotechnology*, 20 (2009) 085607 (9 pages).

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] "Transparent conductors as solar energy materials: A panoramic review", by Claes G. Granqvist, in *Solar Energy Materials &. Solar Cells*, 91 (2007), sect. 5.2-5.3, pp. 1555-1558.
[2] "Optical and electrical properties of vanadium oxides synthesized from alkoxides", by J. Livage, *Coordination Chemistry Reviews*, 190-192 (1999), pp. 391-403.
[3] Published international patent application WO 01/14498.

The invention claimed is:

1. A thermochromic material, comprising $VO_2$ doped with a first dopant element selected from the group consisting of Al, Mg, Ce, Hf, Zr and Si, and further doped with a second dopant element which is different from the first dopant element and is selected from the group consisting of:
- transition metals having a valency of at least +5 in its oxide; and
- a dopant element capable of forming an oxide with a high bandgap in its electronic structure.

2. The thermochromic material according to claim 1, wherein said first dopant element is selected from the group consisting of Al and Mg.

3. The thermochromic material according to claim 2, wherein said first dopant element is Al and said second dopant element is Mg.

4. The thermochromic material according to claim 1, wherein said second dopant element is selected from the group consisting of W, Mo, Nb, and Ta.

5. The thermochromic material according to claim 2, wherein said second dopant element is selected from the group consisting of W, Mo, Nb, and Ta.

6. The thermochromic material according to claim 2, wherein said $VO_2$ is doped with at least 0.2 at % Al.

7. The thermochromic material according to claim 2, wherein said $VO_2$ is doped with at least 0.35 at % Mg.

8. A method for manufacturing the $VO_2$-based thermochromic material according to claim 1, comprising the steps of:
- doping a $VO_2$-based thermochromic material with a first dopant element, wherein the first dopant element is selected from the group consisting of Al, Mg, Ce, Hf, Zr and Si; and
- co-doping said doped $VO_2$-based thermochromic material with a second dopant element which is different from the first dopant element and is selected from the group consisting of:
  - transition metals having a valency of at least +5 in its oxide; and
  - a dopant element capable of forming an oxide with a high bandgap in its electronic structure.

9. The thermochromic material according to claim 2, wherein said $VO_2$ is doped with at least 0.6 at % Al.

10. The thermochromic material according to claim 2, wherein said $VO_2$ is doped with at least 1.1 at % Al.

11. The thermochromic material according to claim 2, wherein said $VO_2$ is doped with at least 1.8 at % Al.

12. The thermochromic material according to claim 2, wherein said $VO_2$ is doped with at least 0.8 at % Mg.

13. The thermochromic material according to claim 2, wherein said $VO_2$ is doped with at least 1.3 at % Mg.

14. The thermochromic material according to claim 2, wherein said $VO_2$ is doped with at least 1.7 at % Mg.

15. The thermochromic material according to claim 2, wherein said $VO_2$ is doped with at least 2.2 at % Mg.

16. The thermochromic material according to claim 2, wherein said $VO_2$ is doped with at least 2.9 at % Mg.

17. The thermochromic material according to claim 2, wherein said $VO_2$ is doped with less than 5.5 at % Mg.

18. The thermochromic material according to claim 2, wherein said $VO_2$ is doped with less than 4.9 at % Mg.

* * * * *